April 21, 1942.  H. M. LANG  2,280,243
SWITCH

Filed Nov. 27, 1939

INVENTOR
Harold M. Lang
BY Geo. L. Parkhurst
ATTORNEY

Patented Apr. 21, 1942

2,280,243

UNITED STATES PATENT OFFICE 2,280,243

SWITCH

Harold M. Lang, Tulsa, Okla., assignor to Stanolind Oil and Gas Company, Tulsa, Okla., a corporation of Delaware Application November 27, 1939, Serial No. 306,231

3 Claims. (Cl. 200—152)

This invention relates to a switch and in particular to a blaster switch mechanism. Still more particularly it relates to apparatus of this type which is of particular utility in seismic surveying operations.

A familiar type of blaster mechanism includes a rack with a handle, a generator and a gear mechanism by which the generator is rotated on operation of the rack. As this device is used in seismic surveying the blaster normally also includes a switch so that the circuit connecting the blaster to the blaster cap is closed momentarily at the point of maximum speed of the generator, i. e. when the handle and rack reach their lowest points. A recording circuit is associated with the blaster and an oscillograph element indicates on the seismic surveying record the period during which this switch is closed and current is flowing from the blaster. The switches heretofore used have been of mechanical types directly associated with the rack. While these switches close only momentarily the period is sufficiently long to cause serious trouble in seismic surveying operations since in such operations it is essential to know with great accuracy the instant at which the shot was fired.

Morever, the conventional type of blaster switch has numerous other disadvantages which keep it from being entirely satisfactory in any type of operation and particularly make it unsatisfactory for seismic surveying operations; for instance, this type of switch often causes an open spark which constitutes a serious hazard when working around producing wells. The switch is subjected to considerable wear and its current carrying capacity is often impaired. Its adjustment is not always retained and this results in arcing. The entry of oil from the blaster mechanism, mud and salt water often interfere with the operation of the conventional switch. Most serious of all, however, is the relatively long period of operation of the switch. Not only is this period long but it is somewhat variable. It is therefore impossible to tell on the seismic surveying record the exact instant of firing and this introduces very serious errors into the computations made in seismic surveying operations. Further not only do such mechanical switches operate over a period of far too great and far too variable a number of milliseconds but also they do not close instantaneously and open instantaneously with the result that the voltage builds up gradually and dies off gradually due to contact leakage thereby causing a "tail" on the records made in seismic surveying operations.

Objects of my invention include the elimination of all these difficulties encountered in the use of prior art blaster switches. More particularly it is an object of my invention to provide a switch with an extremely short interval of operation. A further object is to provide such a switch with a short and accurately reproducible period of operation. It is a still further object of my invention to provide a switch of this type in which the period of operation is short, accurately reproducible and adjustable.

It is a further object of my invention to provide a switch which has a high current carrying capacity. Another object is to provide a completely enclosed switch which will give no open spark hazard. It is a further object of my invention to provide a blaster switch which will retain its adjustment because of protection from arcing, oil, mud and salt water.

Yet another object of my invention is to provide a switch with extremely low contact leakage thereby eliminating the tail on the time breaks shown on seismic surveying records. Other and more detailed objects, advantages and uses of my invention will become apparent as the description thereof proceeds.

In short my invention contemplates a mercury type of switch carrying a spring mount which is actuated by the rack of the blaster. When the rack hits the mount the enclosed switch chamber is thrown downward and a drop of mercury or other fluid contact medium in the chamber remains relatively motionless due to its inertia and thereby comes in contact with a pair of contacts in the switch chamber. The switch is so designed that the mercury immerses the contacts and then immediately returns to its rest position under the influence of gravity. The result is a switch in which the output of the blaster is connected to the detonating cap and to the recording circuit for a very small and accurately predetermined number of milliseconds.

My invention will be described in greater detail with reference to the accompanying drawing which forms a part of this specification and in which corresponding numbers designate corresponding parts:

Figure 1:
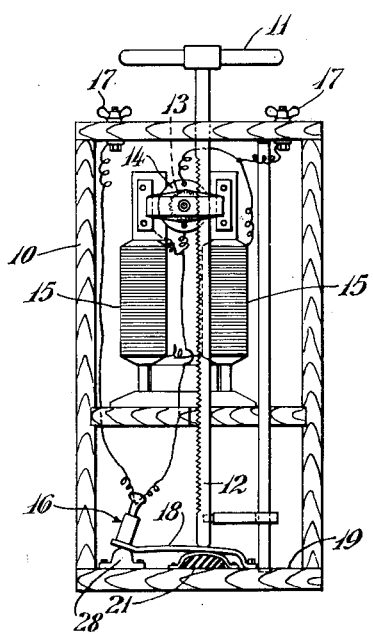
Figure 1 is a cross sectional elevation of a blaster equipped in accordance with my invention.
Figure 2:
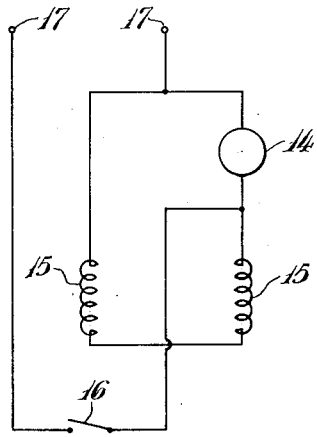
Figure 2 is an internal wiring diagram of the blaster of Figure 1.

Turning to Figure 1, the blaster includes a case 10 through which projects a handle 11 connected with a rack 12. When the blaster is operated the handle is depressed, the rack rotates gear 13 which is connected with generator 14 and a current is generated which flows via a commutator and brushes at the back of the device (not shown) through field coils 15. At the bottom of its movement rack 12 actuates switch 16 of Figure 3, thus sending current to the external circuits (not shown) connected to binding posts 17. The electrical circuits will readily be understood by reference to Figure 2.

Figure 3:
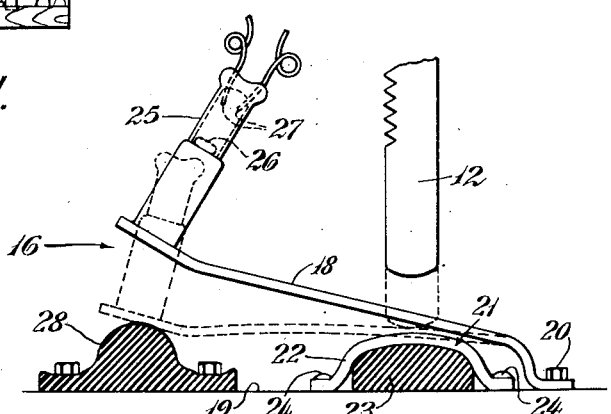
Figure 3 is an elevation of the lower portion of the blaster of Figure 1 showing one form of switch in accordance with my invention.

Referring to Figure 3, a switch mechanism 16 in accordance with my invention is illustrated in more detail. A leaf spring 18 is secured to the base 19 of the blaster by set screws 20 of which only one is seen in elevation. Spring 18 cooperates with bumper 21, which may be made of a leather strap 22, secured to base 19 above a rubber block 23 by screws 24. On the top of the free end of this spring 18 a mercury switch chamber 25 is mounted approximately vertically. This switch chamber is preferably filled with nitrogen or other inert gas and contains a drop of mercury or other liquid contact medium 26 normally at rest in the bottom of the chamber. In operation the blaster rack bar 12 at the completion of its stroke rapidly displaces spring 18 in a downward direction. This, of course, forces switch chamber 25 down very rapidly into the position shown in dotted lines in Figure 3 and the inertia of the globule of mercury 26 causes it to remain substantially motionless as the tube is displaced above. This globule thus comes into contact with the electrodes 27 thereby instantaneously closing the output circuit of generator 14. The travel of the spring 18 is arrested by a shock cushion 28 which may be made of sponge rubber. When the spring reaches the shock cushion gravity draws the mercury globule 26 free of the electrodes 27, thus opening the circuit. The total time the circuit is closed is extremely small compared with a mechanical type of switch and this short time interval can be adjusted to some extent by changing the spacing between spring 18 and shock cushion 28.

A switch of this type has high current carrying capacity and can take care of at least twice the normal current of 2 to 4 amperes without electrode wear. There can be no open sparks and the mechanism cannot get out of adjustment through arcing, oil, mud or salt water. The contact leakage is very small.

Figure 4:
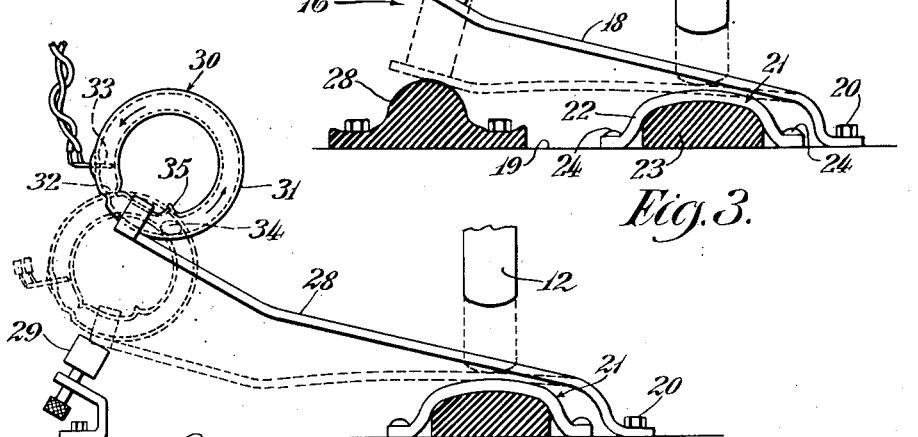
Figure 4 is an elevation similar to Figure 3 but showing another and superior embodiment of my invention.

While the switch just described is very satisfactory, I have found that a switch which is still more satisfactory in some respects can be built in accordance with Figure 4. This switch gives considerably shorter time intervals than that of Figure 3. In Figure 4 is shown a leaf spring 28 and an adjustable shock cushion 29 similar in function to Figure 3 but the spring is bent upward as shown so that when the rack bar actuates it the switch chamber 30 is given a motion which has a rotary component as well as a translational component.

The switch chamber 30 consists of a sealed hollow glass ring 31 containing a stricture 32 and the electrodes 33. Within the switch chamber is a mercury globule 34 although other fluid contact medium could be used. This globule was inserted through a side tube 35 subsequently sealed off as shown. When the switch is operated the mercury globule follows the path shown by the arrow and traverses the circular passageway in a counter-clockwise direction, passing by the electrodes or contacts 33 in a very short period of time. These electrodes are located side by side in the form shown but can be separated in the direction of travel of the globule instead of transverse to it if desired. In any event, they are separated by a distance sufficient to avoid leakage or arcing but less than the diameter of the globule 34. The motion of the mercury is arrested by passing through stricture 32 so that it does not contain sufficient energy to make another revolution and therefore comes to rest at the bottom of the switch chamber as shown.

While I have described my invention in connection with certain embodiments thereof, it is to be understood that these are by way of illustration rather than by way of limitation and I do not intend to be limited thereo but only to the scope of the appended claims.

I claim:

1. An inertia switch comprising a sealed annular chamber, a leaf spring mount supporting said chamber and extending tangentially therefrom, a single pair of electrodes within said chamber remote from said supporting spring mount, a globule of conductive liquid within said chamber normally at rest at a point removed from the said part of electrodes and said spring mount, and a restraining means within said chamber between said pair of electrodes and the rest position of the said conductive liquid.

2. A switch comprising a chamber, a single pair of electrodes extending within said chamber, a globule of mercury within said chamber and normally at rest at a point remote from said pair of electrodes, a spring support for said chamber, one end of the spring support being fixed and the free end supporting said chamber in substantially the plane of movement of said spring and means adapted to strike said spring whereby said globule of mercury is forced only once in contact with the pair of electrodes.

3. A switch comprising an annular chamber, a single pair of adjacent electrodes extending within said chamber, a globule of mercury within said chamber normally at rest at a point remote from said adjacent electrodes, a leaf spring support from said chamber one end of said support being fixed and the free end supporting said chamber in substantially the plane of motion of said leaf spring support and means adapted to strike said leaf spring whereby said globule of mercury is forced only once around the annular chamber past the pair of electrodes.

HAROLD M. LANG.